No. 613,736. Patented Nov. 8, 1898.
J. P. THEISEN.
BELT TIGHTENER.
(Application filed June 24, 1898.)
(No Model.)
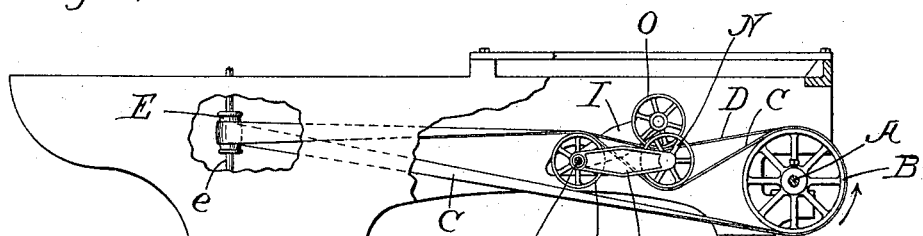
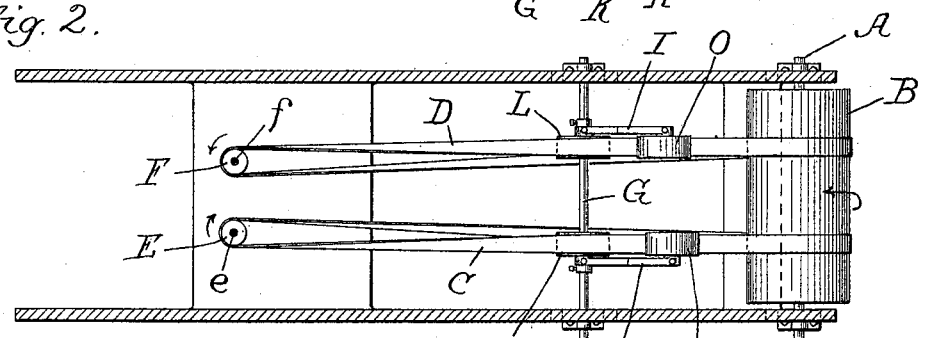
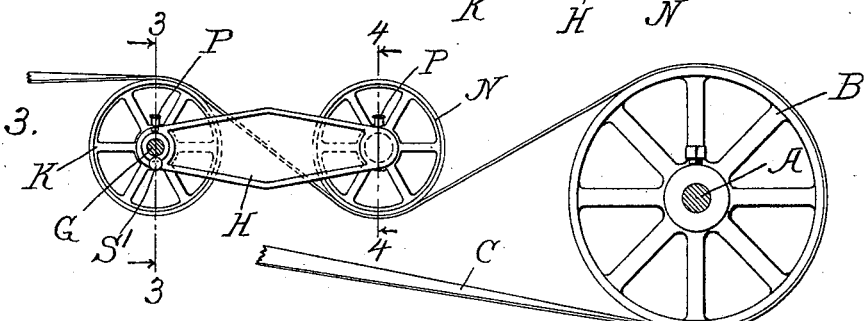
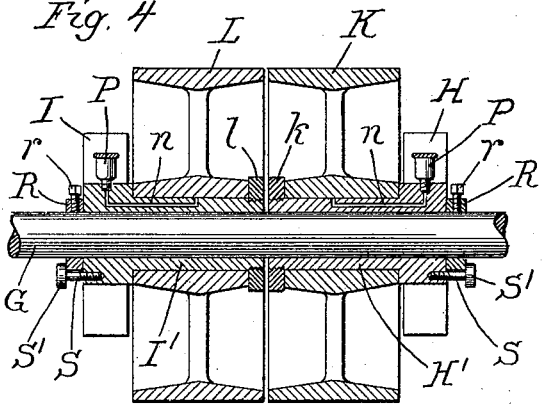
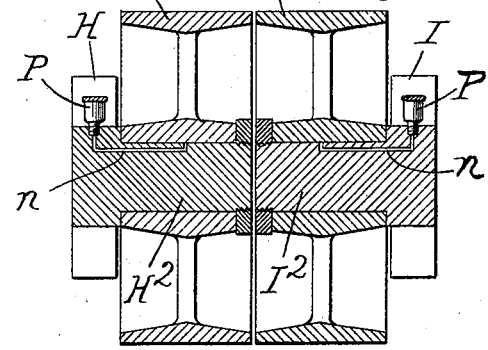
Witnesses.
Edward T. Wray.
Jean Elliott.
Inventor.
Joseph P. Theisen
by Burton & Burton
his attys.
THE NORRIS PETERS CO., PHOTO-LITHO., WASHINGTON, D. C.

UNITED STATES PATENT OFFICE.

JOSEPH P. THEISEN, OF MINNEAPOLIS, MINNESOTA, ASSIGNOR OF ONE-HALF TO JOHN F. WILCOX, OF SAME PLACE.

BELT-TIGHTENER.

SPECIFICATION forming part of Letters Patent No. 613,736, dated November 8, 1898.

Application filed June 24, 1898. Serial No. 684,346. (No model.)

*To all whom it may concern:*

Be it known that I, JOSEPH P. THEISEN, a citizen of the United States, residing at Minneapolis, county of Hennepin, and State of Minnesota, have invented certain new and useful Improvements in Belt-Tighteners, which are fully set forth in the following specification, reference being had to the accompanying drawings, forming a part thereof.

This invention is designed especially for the purpose of automatically taking up the slack of driving-belts which transmit power from a driving-pulley to a driven pulley whose axis of rotation is not in the same plane as that of the driving-pulley. This involves the difficulty that the slack ply of the belt running from a horizontal driving-pulley to a vertical driven pulley—for example, being the ply which is moving onto the driven pulley—must leave the driving-pulley in the horizontal plane through the middle point or crown of the driven pulley, since otherwise it tends to run off the driven pulley. An ordinary slack-pulley applied to this ply of the belt to the extent that there is slack to be taken up diverts the ply out of the proper plane, and if there is much slack it is impossible to retain the belt on the driven pulley without wide flanges, and then only at the expense of severe wear on the edge of the belt and loss of power by friction against the flange of the pulley. This difficulty is overcome in the device which constitutes my invention.

In the drawings, Figure 1 is a sectional plane of a machine—as, for example, a matching-planer—showing a horizontal driving-pulley or drum and two vertical driven shafts with the quarter-twist belts which connect them provided with my take-up device, section being made at a horizontal plane above the driven pulleys. Fig. 2 is a detail side elevation of my take-up device shown in proper relation to the driving pulley and belt, the remainder of the mechanism being omitted from the view. Fig. 3 is a detail section at the line 3 3 on Fig. 2. Fig. 4 is a detail section at the line 4 4 on Fig. 2.

A is a horizontal driving-shaft; B, the drum or driving-pulley thereon, adapted to accommodate two belts C and D, which run with a quarter-twist to the pulleys E and F on the vertical shafts $e$ and $f$, which in the particular machine from which these illustrations are taken are adapted to carry at the upper ends the vertical cutter-heads of the planer.

G is a shaft or axle which is parallel to the main shaft and extends across the plane between the tight and slack ply of the belts. On this shaft there are pivoted the oscillating frames H and I, which have at one end lateral sleeve projections H' I', by which they are pivotally mounted on the shaft. On the sleeves H' I' are journaled the pulleys K and L, respectively, which are suitably retained in place on the sleeve by nuts $k$ $l$, whose threads are right hand or left hand, according to the direction of rotation of the pulleys, so that the friction of the hubs of the pulleys shall not tend to unscrew the nuts. At the other end the frames H and I have stud-axles $H^2$ $I^2$, upon which are journaled the take-up pulleys N and O, retained in the same manner as the pulleys K and L on the sleeves at the opposite ends of the oscillating frames. The sleeves and stud-axles are suitably provided with oil-ducts, such as $n$, to which oil-cups P P P P are connected.

R R are stop-collars on the shaft G, adapted to be adjusted thereon to fix the position of the slack-pulley frames and pulleys, so that they may be properly within the track of the belts. Since it would be inconvenient to adjust stop-collars on the shafts at the inner ends of the sleeves, I effect the entire adjustment and secure the sleeves against displacement by means of the collars R at the outer sides of the frames, respectively. Such collar being secured by its stop-nut $r$ is overhung by the flange-head S' of the screw S, which is set into the hub of the sleeve closely adjacent to the collar, so that the wide flange-head overhanging the collar checks the movement of the slack-pulley frame away from the collar, while the collar stops the movement in the opposite direction on the shaft. The two frames H and I being independently mounted on the shaft G are adapted to oscillate independently, so that the pulleys N and O may ride upon the upper side of the upper ply of the belts to which they respectively pertain, their position being determined by the amount of slack of the belts, respectively. The shaft G is so placed that the upper side of the pulleys L and K are in the horizontal planes of the middle points of the crowns of the vertical pulleys E and F, respectively, and since the position of the pulleys L and K is invariable and determined by the mounting of the shaft G the belt running from said pulleys L and K to the pulleys E and F is properly directed at all times to the latter pulleys, while the pulleys N and O, located according to the slack of the belt between the driving-pulley B, may rise or fall to take up more or less slack without disturbing the proper relation of the belts to the pulleys. When the shafts e and f are adjusted laterally for the purpose of the work which they perform in the machine, a like adjustment will be made of the frames H and I on the shaft G, so that the belt running from the horizontal pulley will take properly onto the pulleys mounted in the take-up frames.

I claim—

1. In combination with a driving and a driven pulley, whose axes of rotation are not in the same plane, a twist-belt communicating power between them, a take-up device which comprises a shaft parallel with the driving-shaft extending between the two plies of the belt; a pulley thereon suitably situated to direct the belt to the driven pulley; an oscillating frame fulcrumed on such shaft and extending toward the driving-shaft, and a pulley journaled on the free end of such frame adapted to idle on the slack ply of the belt.

2. In combination with a driving-pulley and a driven pulley whose axes are not in the same plane, a twist-belt which communicates power between them; a fixed shaft extending between the plies of the belt; a frame having a laterally-projecting sleeve and thereby fulcrumed on such fixed shaft; a pulley journaled on the sleeve having its periphery which is toward the slack ply located in a plane which is at right angles to the axis of the driven pulley and which passes through the crown of said pulley, whereby it is adapted to properly direct the belt to the driven pulley; and a take-up pulley journaled on the free end of the frame in position to idle on the slack ply of the belt.

3. In combination with a horizontal driving-pulley and a vertical driven pulley and a quarter-twist belt communicating power between them; a fixed horizontal shaft extending between the plies of the belt; a frame having a laterally-projecting sleeve and thereby fulcrumed on such shaft; a pulley journaled on the sleeve having its periphery which is toward the slack ply located in the horizontal plane of the crown of the driven pulley; whereby it is adapted to properly direct the belt to the driven pulley; and a take-up pulley journaled on the free end of the frame overhanging the slack ply of the belt.

4. In combination with the horizontal shaft having the driving-pulley B, the vertical driven shafts E and F and the quarter-twist belts which communicate power from the horizontal driving-pulley to the vertical driven pulleys, respectively; the fixed horizontal shaft G extending between the plies of the belts, and the frames H and I fulcrumed thereon, having sleeves H' and I', and adjustable on the shaft; pulleys journaled on said sleeves located in position to direct the belts to the pulleys, respectively, and take-up pulleys journaled on the free oscillating ends of the frames adapted to overhang the belts respectively.

In testimony whereof I have hereunto set my hand, at Minneapolis, Minnesota, this 11th day of June, A. D. 1898.

JOSEPH P. THEISEN.

Witnesses:
  TITUS MARECK,
  FRED A. BAUMAN.